United States Patent
Palmquist et al.

(10) Patent No.: US 10,293,529 B2
(45) Date of Patent: May 21, 2019

(54) SEALING BAR

(71) Applicant: TETRA LAVAL HOLDINGS & FINANCE S.A., Pully (CH)

(72) Inventors: Roland Palmquist, Åkarp (SE); Håkan Andersson, Åkarp (SE); Anders Edsfeldt, Örkelljunga (SE); Rickard Sandberg, Södra Sandby (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 555 days.

(21) Appl. No.: 14/778,533

(22) PCT Filed: Mar. 14, 2014

(86) PCT No.: PCT/EP2014/055182
§ 371 (c)(1),
(2) Date: Sep. 18, 2015

(87) PCT Pub. No.: WO2014/146990
PCT Pub. Date: Sep. 25, 2014

(65) Prior Publication Data
US 2016/0297121 A1  Oct. 13, 2016

(30) Foreign Application Priority Data
Mar. 20, 2013 (EP) .................................... 13160099

(51) Int. Cl.
*B29C 45/00* (2006.01)
*B29C 45/14* (2006.01)
(Continued)

(52) U.S. Cl.
CPC .... *B29C 45/0055* (2013.01); *B29C 45/14549* (2013.01); *B29C 45/14639* (2013.01);
(Continued)

(58) Field of Classification Search
None
See application file for complete search history.

(56) References Cited

U.S. PATENT DOCUMENTS

| | | |
|---|---|---|
| 3,396,258 A | 6/1968 | Leatherman |
| 4,704,509 A | 11/1987 | Hilmersson et al. |

(Continued)

FOREIGN PATENT DOCUMENTS

| | | |
|---|---|---|
| CN | 1516644 A | 7/2004 |
| EP | 0 642 914 A1 | 3/1995 |

(Continued)

OTHER PUBLICATIONS

Google patents translation of EP 0 859 537 A2, Apr. 9, 2018 (Year: 2018).*

(Continued)

*Primary Examiner* — Benjamin A Schiffman
(74) *Attorney, Agent, or Firm* — Buchanan Ingersoll & Rooney PC

(57) ABSTRACT

A method for providing an inductive sealing bar, comprises providing a conductive coil having at least one heating zone, embedding the coil in a supportive body such that the supportive body covers the entire coil along at least some part of the length of the at least one heating zone; and providing a sealing surface of the sealing bar by planarizing the coil and the supportive body such that the coil is exposed along the entire length of said at least one heating zone. The invention also relates to a sealing bar manufactured according to the method.

13 Claims, 4 Drawing Sheets

(51) Int. Cl.
*B65B 9/20* (2012.01)
*B29C 65/00* (2006.01)
*B29C 65/36* (2006.01)
*B65B 51/22* (2006.01)
*B65B 51/30* (2006.01)
*B29C 65/74* (2006.01)
*B29L 31/00* (2006.01)
*B29L 31/26* (2006.01)
*B65B 55/10* (2006.01)
*B29K 705/00* (2006.01)
*B29K 705/02* (2006.01)
*B29K 705/10* (2006.01)

(52) U.S. Cl.
CPC ............ *B29C 65/36* (2013.01); *B29C 65/368* (2013.01); *B29C 65/3656* (2013.01); *B29C 65/3668* (2013.01); *B29C 66/1122* (2013.01); *B29C 66/3462* (2013.01); *B29C 66/3472* (2013.01); *B29C 66/4312* (2013.01); *B29C 66/7234* (2013.01); *B29C 66/72321* (2013.01); *B29C 66/72328* (2013.01); *B29C 66/81* (2013.01); *B29C 66/8122* (2013.01); *B29C 66/81427* (2013.01); *B29C 66/81431* (2013.01); *B29C 66/81433* (2013.01); *B29C 66/83543* (2013.01); *B29C 66/849* (2013.01); *B65B 9/20* (2013.01); *B65B 51/227* (2013.01); *B65B 51/303* (2013.01); *B29C 65/74* (2013.01); *B29C 66/83221* (2013.01); *B29C 2045/0058* (2013.01); *B29C 2793/009* (2013.01); *B29K 2705/00* (2013.01); *B29K 2705/02* (2013.01); *B29K 2705/10* (2013.01); *B29K 2995/0008* (2013.01); *B29L 2031/26* (2013.01); *B29L 2031/7166* (2013.01); *B65B 55/103* (2013.01)

(56) References Cited

U.S. PATENT DOCUMENTS

| | | | |
|---|---|---|---|
| 5,649,407 A | 7/1997 | Blomqvist | |
| 6,216,420 B1 | 4/2001 | Mazzetto et al. | |
| 6,276,114 B1 | 8/2001 | Hayashi | |
| 7,989,012 B2 * | 8/2011 | Gambino | A47J 36/02 |
| | | | 426/505 |
| 2004/0182046 A1 | 9/2004 | Babini et al. | |
| 2013/0263556 A1 | 10/2013 | Babini et al. | |

FOREIGN PATENT DOCUMENTS

| | | | | |
|---|---|---|---|---|
| EP | 0859537 A2 * | 8/1998 | | H05B 3/56 |
| EP | 2 468 480 A1 | 6/2012 | | |
| JP | H11-310209 A | 11/1999 | | |
| JP | 2000-103413 A | 4/2000 | | |
| JP | 2003-341628 A | 12/2003 | | |
| SE | 451 973 B | 11/1987 | | |

OTHER PUBLICATIONS

International Search Report (PCT/ISA/210) dated Apr. 28, 2014, by the European Patent Office as the International Searching Authority for International Application No. PCT/EP2014/055182. (6 pages).
International Search Report (PCT/ISA/210) dated Apr. 28, 2014, by the European Patent Office as the International Searching Authority for International Application No. PCT/E P2014/055182.

* cited by examiner

SEALING BAR

TECHNICAL FIELD

The present invention relates to a sealing bar. More particularly, the present invention relates to an inductive sealing bar for sealing carton based packages, as well as to a method for providing such sealing bar.

BACKGROUND

Carton based packages are commonly used within liquid food packaging. Typically, in order to form such packages, a web of carton based material is transported through a filling machine in which said web of carton based material is used to form closed containers, enclosing said liquid food.

One way of providing such packages is to feed the carton based web through a tube forming station, in which two longitudinal ends of the material web is sealed. The liquid product is introduced in the tube, whereby the individual packages are formed by subsequently sealing the upper and lower ends transversally. Flap folding may also be provided for achieving substantially planar upper and lower ends of the package.

Another way of forming carton based packages is to make use of a plastic top, e.g. being closed by a separate closing member, such as a cap. A carton based tube is connected to the plastic top, either simultaneously as the plastic top is molded, or as a separate step after manufacturing of the plastic top. The liquid food is then introduced into the tube/top construction, whereby the open end of the carton based tube is sealed and folded to form a closed package.

Sealing may be accomplished in various ways, however induction sealing has been proven to be a very efficient method. This principle is particularly beneficial for aseptic packages, of which the carton based material includes a thin layer of aluminum arranged in a sandwich construction between two layers of polymeric material for forming a solid barrier against the outer environment. When two ends of such carton based materials are arranged in close proximity to each other, as is the case when a transversal or longitudinal seal is to be achieved, a sealing bar may be pressed against the carton based material. The sealing bar includes a coil, and an electrical current is allowed to flow through the coil. The coil will consequently induce eddy currents, which causes heat to be generated in the aluminum foil. The generated heat will melt the polymeric materials adjacent to the aluminum foil, whereby these layers will bond to each other.

Examples of sealing bars are disclosed in for instance the Swedish Patent Publication SE 451 973 and the European Patent Application EP 0 642 914.

When manufacturing a sealing bar for this purpose, it is necessary to provide a planar surface for controlling close contact between the sealing bar and the packaging material. This is done by a multi-step process, involving a first step of providing the coil. The coil, normally made of copper with a rounded shape, is then grinded to form a smooth and planar surface. The coil is thereafter embedded in a plastic body, whereby the planar surface of the coil is aligned with a planar surface of the body. In this way, the sealing bar will have an entirely planar surface, exposing both the coil and the plastic body thus forming a support for the coil as well as a pressing surface for the sealing process.

However, it has been realized that the sealing bar, in particularly the planar surface, is among other things exposed to very high temperatures during sealing of packages. Such exposure will eventually cause the plastic body to deform from its original shape which may possibly result in a damaged interface between the coil and the plastic body.

Such defects may eventually also reduce the quality of the sealing obtained by the sealing bars, whereby the total quality of the liquid food packages is reduced.

Hence, it would be advantageous to provide a more robust sealing bar avoiding the above-mentioned drawbacks.

SUMMARY

In view of the above, an objective of the invention is to solve or at least reduce the problems discussed above.

An objective of the present invention is to provide a sealing bar and a method of producing a sealing bar, for sealing a carton-based package, having an improved interface between the coil and the supportive body surrounding the coil.

The objective is achieved by a method for providing an inductive sealing bar, comprising the steps of providing a conductive coil having at least one heating zone, embedding said coil in a supportive body such that said supportive body covers the entire coil along at least some part of the length of the at least one heating zone; and providing a sealing surface of said sealing bar by planarizing said coil and said supportive body such that said coil is exposed along the entire length of said at least one heating zone.

In one or more embodiments said coil and said supportive body are planarized simultaneously in a single step.

In one or more embodiments the step of providing a sealing surface is performed by a material-removing machining process. In one or more embodiments the material-removing machining process is milling.

Further, in one or more embodiments the step of providing a sealing surface is performed by planarizing said coil and said supportive body in a direction being parallel with the longitudinal extension of said at least one heating zone.

In one or more embodiments the step of embedding said coil in said supportive body is performed by a molding process.

Furthermore, in one or more embodiments the molding process is injection molding.

In one or more embodiments the step of embedding said coil in said supportive body is performed by overmolding said coil along at least a part of the longitudinal extension of said at least one heating zone.

In one or more embodiments said overmolding is formed by allowing polymeric material to flow in a direction substantially parallel with the extension of the at least one heating zone.

In one or more further embodiments said polymeric material is allowed to flow on each side of said coil, thus forming two parallel webs, and to flow into delimited cavities centrally aligned with the longitudinal axis of said coil for connecting said parallel webs.

In one or more embodiments the step of providing a sealing surface further comprises providing a ridge extending along the length of the at least one heating zone.

Further, in one or more embodiments the step of providing a sealing surface of said sealing bar includes removing a part of said coil and a part of said supportive body such that said supportive body surrounds at least 180° of the periphery of said coil.

Furthermore, in one or more embodiments the step of embedding said at least one coil in a supportive body further includes the step of embedding at least one magnetic insert within said supportive body.

In one or more embodiments the step of embedding at least one magnetic insert further includes the step of providing said at least one magnetic insert with rounded corners.

The objective is further achieved by a sealing bar for sealing packaging material in a filling machine, manufactured by the method described above.

BRIEF DESCRIPTION OF DRAWINGS

The above, as well as additional objectives, features and advantages of the present invention, will be better understood through the following illustrative and non-limiting detailed description of embodiments of the present invention, reference being made to the appended drawings.

FIG. 2b is a cross-sectional side view of the sealing bar shown in FIG. 2a;

FIG. 3b is a first cross-sectional side view of the sealing bar shown in FIG. 3a;

FIG. 3c is a second cross-sectional side view of the sealing bar shown in FIG. 3a.

DETAILED DESCRIPTION

Figure 1:
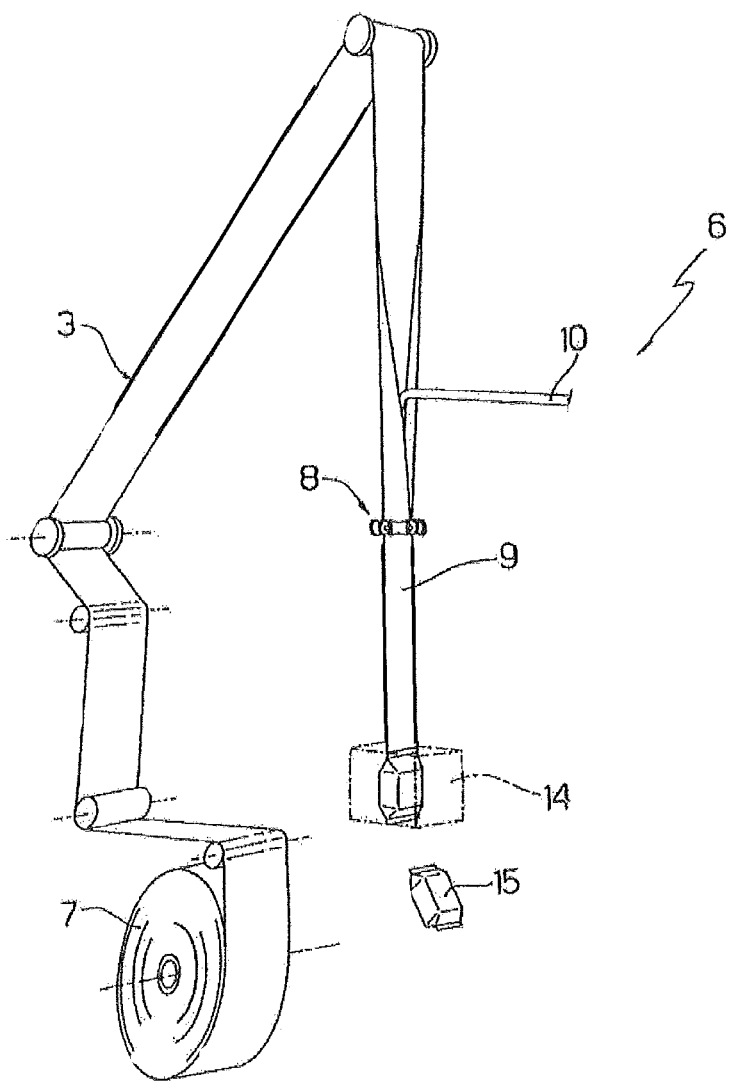
FIG. 1 is a schematic view of a filling machine using a sealing bar according to an embodiment.

Starting with FIG. 1, a liquid food filling machine 6 is shown. The filling machine 6 includes a feed unit 7 for a carton based material web. When running, the carton based material web is transported through the filling machine 6 through various sections, e.g. a sterilizing section 3, and various tension/speed regulating sections. After sterilizing the web, the material is transported through a tube-forming section 8 in which the longitudinal ends of the packaging material are longitudinally sealed to form an open ended tube 9. Liquid food, such as milk, juice, etc. is introduced in the tube 9 by means of a liquid food supply unit 10, whereby a transversal sealing section 14 is provided to seal the tube 9 and cut individual packages 15 from the tube 9. The sealing section 14 may preferably also be provided with folding means for shaping the closed ends of the package.

The sealing section 14 may typically include a sealing bar and a corresponding anvil (not shown). The sealing bar and/or the anvil is moveable towards and away from the tube 9 in order to allow the tube 9 to move in and out from the sealing section 14. When the open ends of the tube 9 are to be sealed, the sealing bar is in close contact with one of the two layers of packaging material of the tube 9. The outer side of the opposite layer of the packaging material is correspondingly in close contact with an associated anvil. Upon activation, the sealing bar generates heat in the packaging material whereby inner polymeric layers of the packaging material layers are melted while they are pressed against each other. After heating, the two polymeric layers have bonded whereby the package is sealed.

Figure 2A:
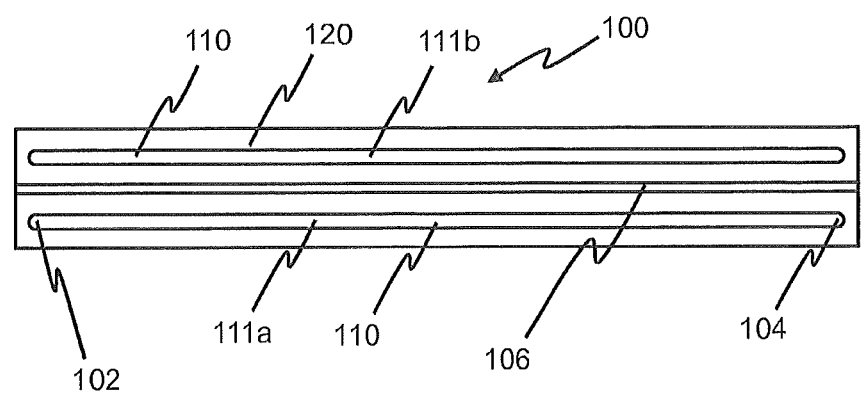
FIG. 2a is a top view of a sealing bar according to an embodiment.
Figure 2B:
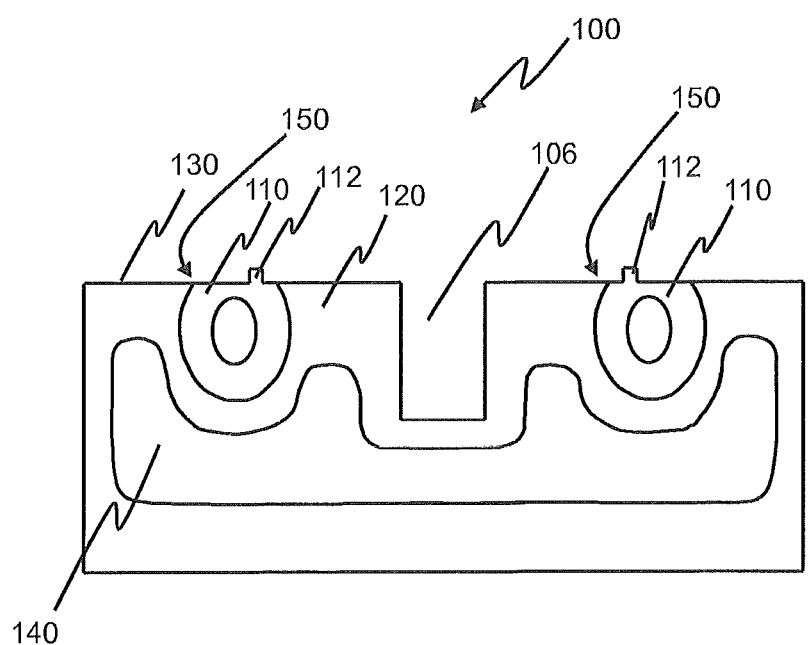

Now turning to FIGS. 2a and 2b, a more detailed view of a sealing bar 100 is shown. The sealing bar 100 includes a coil 110, made of copper, embedded in a supportive body 120 made of polymeric material. The coil 110 extends linearly from a first end 102 of the sealing bar 100 to an opposite end 104, and electrical contacts (not shown) are connected to the coil for allowing electrical current to flow through the coil 110 by means of an external power supply (not shown). Cooling means (not shown) may also be provided within the sealing bar. Preferably, the coil 110 is provided to form two heating zones, wherein the zones are provided in parallel and spaced apart. For such embodiment, the coil 110 extends from a first end 102, extends linearly to the opposite end 104 thus forming a first heating zone 111a, where it changes direction and returns back linearly to the first end 102, thus forming a second heating zone 111b. The first heating zone is preferably arranged at a predetermined distance from the second heating zone. Hence, the two electrical contacts are provided at the first end 102, whereby a single power supply is needed for the two heating zones. By having such arrangement of the coil, a single sealing bar 100 may provide two adjacent seals simultaneously. A groove 106 is provided between the heating zones of the coil 110 for allowing a cutting tool to run in the groove 106 whereby a package may be released from the tube 9 in an efficient manner. Hence, a single sealing bar may simultaneously seal an upper end of a first package as well as a lower end of a subsequent package, as well as providing a cutting line for separating the packages from each other. In order to achieve this, the coil is preferably provided with a part connecting the first heating zone with the second heating zone, which end part extends at an angle relative the heating zones for allowing the coil 110 not to extend into the groove 106.

Now turning to FIG. 2b, a cross-sectional view of the sealing bar 100 is shown. The sealing bar 100 has an upper surface 130 being substantially planar to provide a close contact with the packaging material along the entire length of the sealing bar 100. The upper surface 130 extends over the two heating zones of the coil 110 and is disrupted at the groove 106. Each heating zone of the coil 110 further includes a ridge 112 which protrudes from the planar surface 130 and extends linearly along the entire length of each heating zone in order to ensure full contact between the sealing bar 100 and the packaging material.

A magnetic insert 140 is preferably provided within the supportive body 120 such that it to at least some extent surrounds the coil 110. The magnetic insert 140, which e.g. may be made of ferrotrone, provides an increase of the magnetic field generated upon activation of the sealing bar 100, whereby a less current is needed for achieving a sufficient sealing of the package.

The magnetic insert 140 may extend along the entire length of the coil 110, or it may be provided as isolated members distributed at various positions along the length of the coil 110. Preferably, such isolated magnetic inserts 140 may be arranged at the ends 102, 104 of the heating zones of the coil 110, as well as at the center of the coil 110. The end positions are advantageous in that additional power may be required where the packaging material is folded. Moreover, a centrally positioned magnetic insert 140 may provide additional power to the area where the longitudinal seal of the package is present, thus requiring heat to transfer through an additional layer of packaging material.

Preferably, the magnetic insert(s) 140 are provided with rounded corners as is evident from FIG. 2b. This is advantageous in that the polymeric body 120 will be surrounding the insert 140 in a very robust manner, reducing the risk of trapped holes or cracks which may be present in case of sharp corners of the magnetic insert 140.

The planar surface 130 forms a uniform interface 150 between the supportive body 120 and the coil 110 along the entire length of the heating zones of the coil 110. This ensures robust operation of the sealing bar 100 and reduces the risks for cracks or deformations of the supportive body 120 along this interface 150.

Figure 3A:
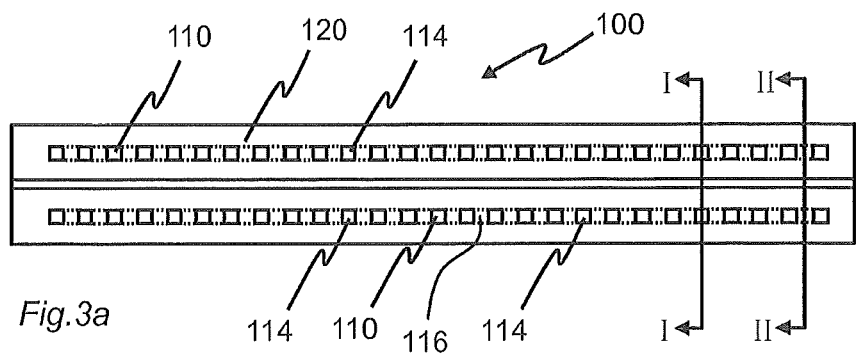
FIG. 3a is a top view of a sealing bar during manufacturing.
Figure 3B:
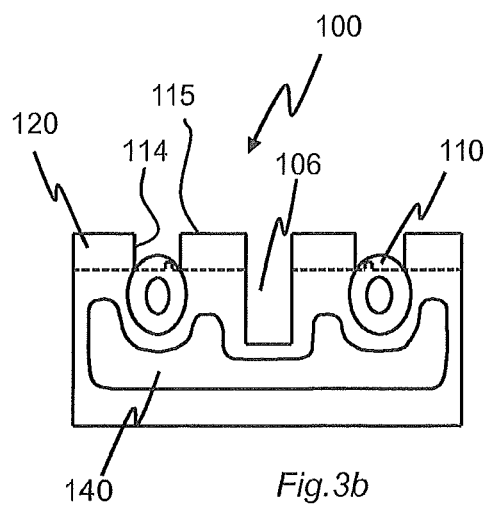
Figure 3C:
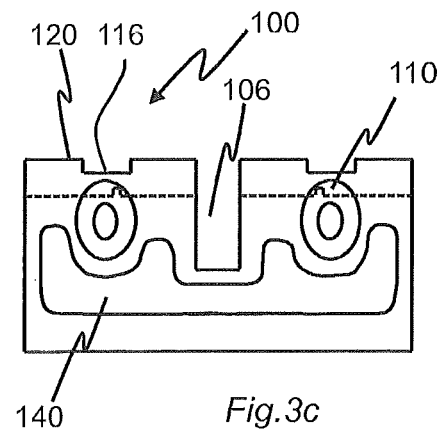

In order to provide an improved sealing bar 100 reference is now made to FIGS. 3a-c. In these figures, a sealing bar 100 is shown during manufacturing, i.e. in an intermediate condition after the coil 110 has been embedded in the supportive body 120.

As can be seen in FIG. 3b, the coil 110 is embedded in the supportive body 120 without a flat sealing surface. In fact, the coil is pre-manufactured by a conductive conduit having a circular, or elliptical, cross section. Preferably, the coil has a tubular shape including a hollow interior space, in which cooling fluid may be supplied to reduce the temperature of the sealing bar during operation. With reference to FIGS. 3a-c, the final shape of the coil, i.e. having a flat sealing surface with a ridge 112, is not yet provided.

The supportive body 120 is formed by molding of a polymeric material. In this embodiment the supportive body 120 is formed by aligning the coil 110 in a mold, and injection molding the polymeric material. For this particular sealing bar 100, the coil 110 is aligned within the mold at a predetermined distance from the inner edge of the mold, such that the polymeric material of the supportive body 120 will cover the entire coil 110, at least along some parts of the length of the heating zones of the coil 110. This is shown in further details in FIG. 3a, where the coil 110 is exposed only along some parts 114 of the length of each heating zone. The exact configuration of the exposed zones 114 of the coil 110 may of course vary; the heating zones of the coil 110 should however be parallel and extend at a specific depth within the supportive body 120.

The exposed zones 114 are formed by protrusions in the mold wall, which protrusions are provided for firmly keeping the coil 110 correctly positioned in the mold during the injection of polymeric material for forming the supportive body 120. I.e. at the exposed zones 114 the coil 110 and the mold have contact with each other during the injection of polymeric material.

The magnetic insert(s) 140 is also aligned within the mold to ensure correct position of the insert 140 relative the coil 110.

By injection molding the supportive body 120 to cover the entire coil 110 at least along some parts of its length, it is ensured that the supportive body 120 is in close contact with the coil 110 along the entire length of the coil 110, whereby a subsequent step of providing the planar surface 130 (indicated by dashed lines in FIGS. 3b and 3c) will form a uniform interface 150 between the supportive body 120 and the coil 110.

Hence, during manufacturing the coil 110 is overmolded. The term "overmolded" here and hereinafter means molding over the coil, i.e. that the coil is at least partly embedded or encapsulated by the polymeric material forming the supportive body 120, i.e. at least some extent covered by the polymeric material forming the body 120, i.e. the sealing bar is manufactured using some excess polymeric material.

The overmolding may be performed in various ways. With reference to FIG. 3b, a semi-finished sealing bar 100 is shown along the line I-I shown in FIG. 3a. As can be seen, at this line the coil is exposed, at exposed zones 114, and the supportive body 120 is formed on every side of the coil 110 and has a top surface 115 being on a higher level than the exposed top surface of the coil 110. Now turning to FIG. 3c, showing the sealing bar along line II-II of FIG. 3a, an overmolded area of the coil 110 is illustrated. The upper surface of the polymeric material is not uniform. In between the exposed areas 114 there are covered areas 116 above the coil 110 at which the thickness of the overmolded polymeric material is not as large as at areas arranged adjacent the coil 110. To form the covered areas 116 the mold is provided with additional protrusions in between the protrusions holding the coil 110. Hence, the polymeric material cannot fill up the areas 116 above the coil 110 to the same extent as the area arranged adjacent to the coil 110.

The inlets for the polymeric material melt are arranged at the lateral ends of the mold, such that the polymeric material melt is directed to flow from one end 102 to the opposite end 104. Hence, the polymeric material melt will flow along the longitudinal extension of the coil and leak into the open spaces formed above the coil, i.e. such that the covered areas 116 are formed and that such that a longitudinal web of overmolding will be provided in parallel with the coil on each sides.

Figure 4:
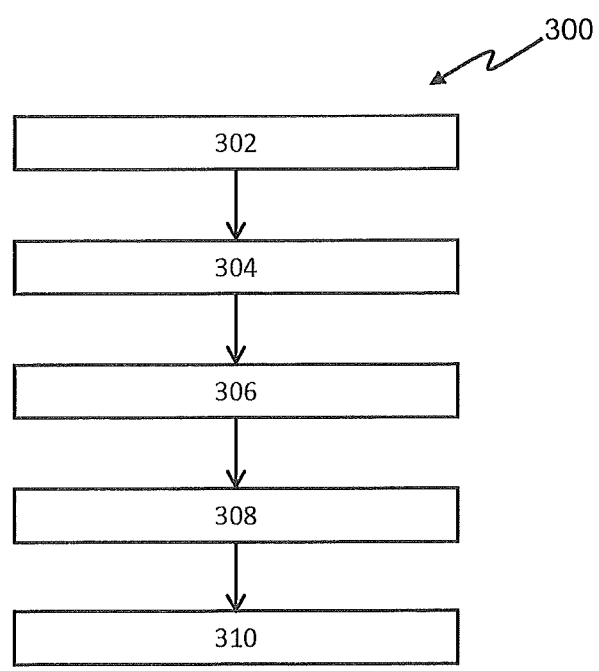
FIG. 4 is a process scheme for providing a sealing bar according to an embodiment.

Now turning to FIG. 4, a more detailed description of a method for providing a sealing bar 100 will be provided. The method 300 includes a first step 302 of providing a coil 110. The coil 110 has a longitudinal extension corresponding to at least the width of the package to be sealed in order to form a liquid food package. Further, the coil 110 has a tubular cross-section, e.g. circular or elliptical, according to what has previously been described.

In a next step 304 the coil is introduced in a mold at a certain distance from the inner surface of the mold such that overmolding of the coil may be provided. Preferably, the method also includes a step 306 in which one or several magnetic inserts are arranged in the mold and aligned with the coil at a predetermined distance. The coil 110 is held in place by protrusions in the mold.

A subsequent step 308 is performed by injection molding a polymer based material into said mold such that the polymer based material is covering the entire coil, at least along some part of its length. The polymer based material may e.g. be a compound material in order to improve the quality of the final sealing bar. In particular, the polymer based material should be capable of withstanding high temperatures as well as rapid heating and cooling without deforming.

Step 308 is preferably performed such that the polymeric material melt flows substantially parallel with the coil along the length of the heating zones, and is allowed to leak in the space formed between the coil and the mold to cover the coil at specific positions, i.e. covered areas 116. Hence, longitudinal webs of polymeric material are formed adjacent to the coil on each sides of the coil (i.e. each side of each heating zone). For each heating zone of the coil two opposite polymeric material melt webs are allowed to meet at positions where the coil is not in contact with the mold such that the coil is completely covered at these positions.

In a final step 310 the molded sealing bar, i.e. the coil embedded in a supportive body, is machined to form a planar sealing surface. Step 310 also includes the provision of the longitudinal ridges 112. Preferably, a single milling step is performed to provide a planar surface of the supportive body 120, a planar surface of the coil 110, as well as the ridge 112. More preferably, the milling step is made in a longitudinal direction of the sealing bar, starting at one of the ends 102, 104.

This final step 310 ensures that the interface between the coil and the polymeric body at the surface of the sealing bar is uniform, such that no cracks or deformations will cause the polymeric body to expose the coil to a further extent than after manufacturing.

As previously been described, overmolding of the coil and subsequent removal of excessive coil material as well as excessive supportive body material will ensure a more uniform interface between the coil and the supportive body, especially at the planar surface intended to face the packaging material during use of the sealing bar.

Overmolding may be achieved in a various ways. For example, as previously been described, the coil may be overmolded by a plurality of ribs extending transversally over the coil due to polymeric material melt flowing from the longitudinal webs. These ribs may be provided at a constant distance from each other, and preferably the width of each rib is substantially the same as the distance between two adjacent ribs. Moreover, overmolding may also be done by providing one or more longitudinal ribs, extending along the length of the coil to cover the coil.

It is apparent to a person skilled in the art that with the advancement of technology, the basic idea may be implemented in various ways. The invention and its embodiments are thus not limited to the examples described above; instead they may vary within the scope of the claims.

In the exemplary embodiment the coil 110 is made of copper and the supportive body is made of polymeric material. In other embodiments other materials can be used. The coil may for example instead be made of aluminium, silver, gold or alloys based on copper. The supportive body 120 may alternatively be made of a ceramic material.

The embodiment shown in FIGS. 3a-3c is showing one example of overmolding with exposed areas 114. It is to be understood that alternative overmolding can be made. If the coil 110 is held in place by fixation means at its lateral ends 102, 104, instead of being held by protrusions in the mold wall creating the exposed areas 114, the coil may be totally overmolded. Similar to the embodiment in FIGS. 3a-c the inlets for the polymeric material melt should be arranged at the lateral ends of the mold, such that the polymeric material melt is directed to flow from one end 102 to the opposite end 104. In another alternative overmolding the coil 110 is held by a thin longitudinal protrusion, provided in the mold, extending from one lateral end 102 to the other lateral end 104. Overmolding is then created in areas adjacent the coil 110, and some along the coil 110, but leaving the coil 110 exposed at least along a continuous centerline aligned with the longitudinal extension of the coil 110.

In the exemplary embodiment the molded sealing bar, i.e. the coil embedded in a supportive body, is machined to form a planar sealing surface, and that a milling process is performed. Milling is a machining process involving cutting the material with a rotary milling cutter. Alternatively, another material-removing process can be used, for example an abrasive machining process such like for example grinding.

Similarly, it has been described that the supportive body 120 is formed by injection molding of a polymeric material. In alternative embodiments the supportive body 120 is formed by other conventional molding processes such as for example compression molding, injection compression and transfer pressing/molding.

The invention claimed is:

1. A method for providing an inductive sealing bar, comprising:
    positioning a conductive coil in an injection mold, the conductive coil being a tubular body extending linearly in an axial direction, the conductive coil possessing a top portion when the conductive coil is in the injection mold;
    injection molding a polymeric material into the injection mold while the conductive coil is in the injection mold, the polymeric material flowing over the top portion of the conductive coil at spaced apart locations so that the polymeric material covers the conductive coil at delimited cavities spaced apart in the axial direction, the polymeric material creating a supportive body around the conductive coil; and
    planarizing the conductive coil and the supportive body to form the inductive sealing bar such that the top portion of the conductive coil is exposed along the entire length of at least one heating zone of the inductive sealing bar.

2. The method of claim 1, wherein said conductive coil and said supportive body are planarized simultaneously in a single step.

3. The method of claim 1, wherein the planarizing is milling.

4. The method according to claim 1, wherein the planarizing of said conductive coil and said supportive body is in a direction parallel with a longitudinal extension of at least one heating zone to form a sealing surface of the inductive sealing bar.

5. The method according to claim 4, wherein said injection molding comprises allowing the polymeric material to flow in a direction substantially parallel with the longitudinal extension of the at least one heating zone.

6. The method according to claim 5, wherein said polymeric material is allowed to flow on each side of said coil, thus forming two parallel webs, and to flow into said delimited cavities, the delimited cavities being centrally aligned with the longitudinal axis of said coil for connecting said parallel webs.

7. The method according to claim 4, wherein the planarizing further comprises providing a ridge extending along the length of the at least one heating zone.

8. The method according to claim 4, wherein the forming of the sealing surface of said inductive sealing bar includes removing a part of said coil and a part of said supportive body such that said supportive body surrounds at least 180° of the periphery of said coil.

9. The method according to claim 1, further comprising embedding at least one magnetic insert within said supportive body.

10. The method according to claim 9, wherein the embedding of at least one magnetic insert further includes providing said at least one magnetic insert with rounded corners.

11. The method according to claim 1, wherein the planarizing comprises machining a protruding ridge protruding at the top portion of the conductive coil, the protruding ridge extending along the entire length of the at least one heating zone of the inductive sealing bar.

12. A method for providing an inductive sealing bar, comprising:
    positioning a conductive coil in an injection mold, the conductive coil being a tubular body, the injection mold contacting the conductive coil at spaced apart locations along a top portion of the conductive coil to fix the position of the conductive coil in the injection mold;
    injection molding a polymeric material into the injection mold while the conductive coil is fixed in the injection mold, the polymeric material creating a supportive body around the conductive coil, the top portion of the conductive coil possessing exposed zones which are not covered by the polymeric material and covered zones which are entirely covered by the polymeric material; and planarizing the conductive coil and the supportive body to form the inductive sealing bar such that the top portion of the conductive coil is exposed along the entire length of at least one heating zone of the inductive sealing bar.

13. The method according to claim 12, wherein the planarizing comprises machining a protruding ridge protruding at the top portion of the conductive coil, the protruding ridge extending along the entire length of the at least one heating zone of the inductive sealing bar.

\* \* \* \* \*